(12) United States Patent
Hata

(10) Patent No.: US 7,688,478 B2
(45) Date of Patent: Mar. 30, 2010

(54) IMAGE PROCESSING APPARATUS, IMAGE PROCESSING METHOD, AND PROGRAM FOR IMPLEMENTING THE METHOD

(75) Inventor: Toshiyuki Hata, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1573 days.

(21) Appl. No.: 10/807,806

(22) Filed: Mar. 23, 2004

(65) Prior Publication Data

US 2004/0190056 A1 Sep. 30, 2004

(30) Foreign Application Priority Data

Mar. 24, 2003 (JP) .............................. 2003-079726

(51) Int. Cl.
*H04N 1/04* (2006.01)
(52) U.S. Cl. ...................... 358/474; 358/1.15; 358/1.16; 358/525; 348/578; 348/584; 715/723; 715/202; 382/100; 382/294
(58) Field of Classification Search .................. 358/474, 358/1.15, 448, 486, 1.16, 514, 525; 382/131, 382/154, 294, 100; 348/772, 578, 584, 705, 348/E5.056, 722, 586; 715/723, 202
See application file for complete search history.

(56) References Cited

U.S. PATENT DOCUMENTS 5,155,301 A * 10/1992 Mase ........................ 174/88 R
5,531,520 A * 7/1996 Grimson et al. ............. 382/131
5,652,628 A * 7/1997 Toyoshima et al. ........... 725/56
5,999,840 A * 12/1999 Grimson et al. ............. 600/424
6,310,279 B1 * 10/2001 Suzuki et al. ................. 84/600
6,452,612 B1 * 9/2002 Holtz et al. ................. 715/723
6,900,847 B1 * 5/2005 Agneta et al. ............... 348/552
7,020,381 B1 * 3/2006 Kato et al. ..................... 386/52
2002/0118302 A1 * 8/2002 Iizuka et al. ................. 348/578

FOREIGN PATENT DOCUMENTS

EP 0 945 849 6/2003

* cited by examiner

*Primary Examiner*—Negussie Worku
(74) *Attorney, Agent, or Firm*—Morrison & Foerster LLP

(57) ABSTRACT

An image processing apparatus which processes input image signals in real time. A plurality of image signals are input via input terminals. An external storage device stores a plurality of kinds of procedures for processing to be performed on image signals. A JOG dial specifies at least two kinds of procedures among the stored plurality of kinds of procedures, and enables the specified procedures and a procedure between the specified procedures to be arbitrarily changed and specified. When the procedure between the specified procedures is specified using the JOG dial, a CPU generates the specified procedure by interpolating the specified procedures, and carries out real-time processing on image signals for corresponding channels among the image signals for the plurality of channels according to the generated specified procedure.

5 Claims, 11 Drawing Sheets

IMAGE PROCESSING APPARATUS, IMAGE PROCESSING METHOD, AND PROGRAM FOR IMPLEMENTING THE METHOD

BACKGROUND OF THE INVENTION

1. Field of the Invention

The present invention relates to an image processing apparatus and an image processing method which process input image signals in real time, as well as a program for implementing the method.

2. Description of the Related Art

Conventionally, an image processing apparatus has been known which receives desired image signals, stores them as image data in an external storage device for example, and then processes (edits) the image data.

Examples of the image processing apparatus include an image processing apparatus which displays stored image data with specific image data (e.g. title data for a corresponding image) superposed thereon, an image processing apparatus which can change the quality of stored image data, and an image processing apparatus which displays plural pieces of stored image data on different windows at the same time.

In the above conventional image processing apparatuses, however, image data to be processed is image data which has already been stored, and hence it is impossible to process input image signals in real time.

SUMMARY OF THE INVENTION

It is therefore an object of the present invention to provide an image processing apparatus and an image processing method which can process input image signals in real time, as well as a program for implementing the method.

To attain the above object, in a first aspect of the present invention, there is provided an image processing apparatus comprising an input device that inputs image signals for a plurality of channels, a storage device that. stores a plurality of kinds of procedures for processing to be performed on the image signals, an operating element that specifies at least two kinds of procedures among the plurality of kinds of procedures stored in the storage device, and enables the specified procedures and at least one procedure between the specified procedures to be arbitrarily changed and specified, and a processing device operable when the procedure between the specified procedures is specified using the operating element, to generate the specified procedure by interpolating the specified procedures, and carry out real-time processing on at least one image signal for at least one corresponding channel among the image signals for the plurality of channels input by the input device according to the generated specified procedure.

According to the first aspect of the present invention, when the operating element which specifies at least two kinds of procedures among a plurality of kinds of procedures stored in the storage device, and enables the specified procedures and at least one procedure between the specified procedures to be arbitrarily changed and specified specifies the procedure between the specified procedures, the specified procedure is generated by interpolating the specified procedures, and real-time processing is carried out on image signals for corresponding channels among the image signals for a plurality of channels input by the input device according to the generated specified procedure. Therefore, input image signals can be processed in real time, and an instruction for changing procedures can be given at an arbitrary speed using the operating element. This improves the operability for the operator.

Preferably, the image processing apparatus further comprises an output device that outputs an image signal, and the processing device outputs the image signal, subjected to the real-time processing, in real time via the output device.

More preferably, the procedures each comprise designating size and position of an image to be displayed in accordance with an image signal for a corresponding channel.

More preferably, the operating element is capable of sequentially changing and specifying the specified procedures and the procedure between the specified procedures.

To attain the above object, in a second aspect of the present invention, there is provided an image processing method comprising the steps of storing a plurality of kinds of procedures for processing to be performed on image signals, when an operating element that specifies at least two kinds of procedures among the stored plurality of kinds of procedures, and enables the specified procedures and at least one procedure between the specified procedures to be arbitrarily changed and specified specifies the procedure between the specified procedures, generating the specified procedure by interpolating the specified procedures, and carrying out real-time processing on at least one image signal for at least one corresponding channel among the image signals for the plurality of channels input by an input device according to the generated specified procedure.

According to this image processing method, the same effects as those obtained by the image processing apparatus according to the first aspect can be obtained.

To attain the above object, in a third aspect of the present invention, there is provided a program for causing a computer to execute an image processing method comprising the steps of storing a plurality of kinds of procedures for processing to be performed on image signals; when an operating element that specifies at least two kinds of procedures among the stored plurality of kinds of procedures, and enables the specified procedures and at least one procedure between the specified procedures to be arbitrarily changed and specified specifies the procedure between the specified procedures, generating the specified procedure by interpolating the specified procedures, and carrying out real-time processing on at least one image signal for at least one corresponding channel among the image signals for the plurality of channels input by an input device according to the generated specified procedure.

According to this program, the same effects as those obtained by the image processing apparatus according to the first aspect can be obtained.

The above and other objects, features, and advantages of the invention will become more apparent from the following detailed description taken in conjunction with the accompanying drawings.

BRIEF DESCRIPTION OF THE DRAWINGS

FIGS. 7A to 7C are views showing examples of how to use a recorded scene, in which:

FIG. 7A shows an example where image signals input to respective channels 1 to 4 are processed and displayed based on a recorded scene 1, i.e. according to an image processing manner in which four-split screens are displayed in layers;

FIG. 7B shows an example where image signals input to respective channels 2 and 3 are processed and displayed based on a stored scene 2, i.e. according to an image processing manner in which two-split screens for the channels 2 and 3 are displayed in layers with the screen for the channel 2 being enlarged and the screen for the channel 3 being shifted upward; and FIG. 7C shows an example where the outline of the scene 2 is displayed on a display appearing in FIG. 1;

DETAILED DESCRIPTION OF THE PREFERRED EMBODIMENTS

The present invention will now be described in detail with reference to the drawings showing a preferred embodiment thereof.

Figure 1:
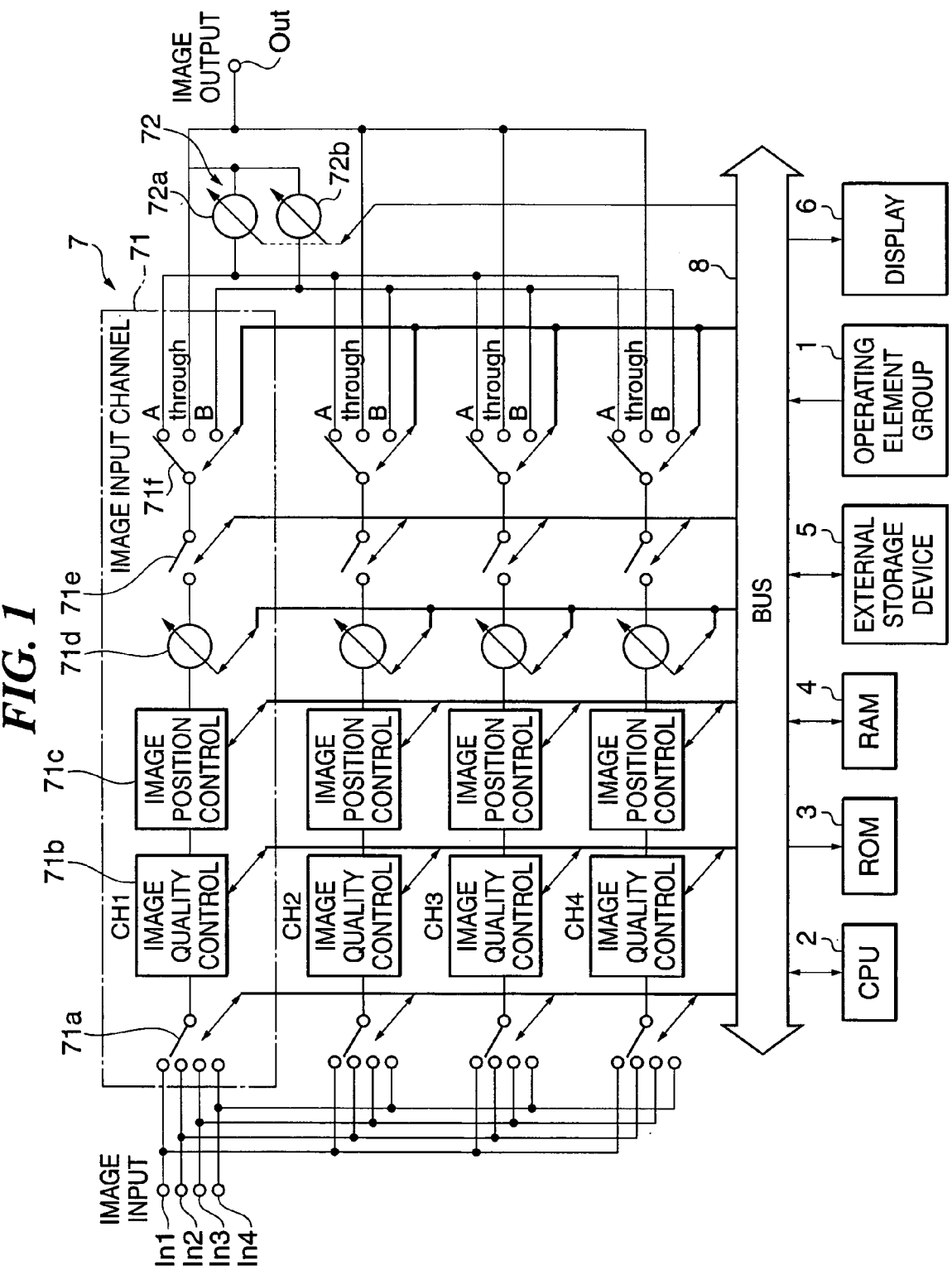
FIG. 1 is a block diagram schematically showing the construction of a video mixer to which an image processing apparatus according to an embodiment of the present invention is applied.

FIG. 1 is a block diagram schematically showing the construction of a video mixer to which an image processing apparatus according to an embodiment of the present invention is applied.

As shown in FIG. 1, the video mixer according to the present embodiment includes an operating element group 1 comprised of a plurality of operating elements such as rotary operating elements, sliding operating elements, and buttons; a CPU 2 which controls the overall operation of the video mixer; a ROM 3 which stores control programs to be executed by the CPU 2, a variety of table data, and so forth; a RAM 4 which temporarily stores musical composition data, various input information, calculation results, and so forth; an external storage device 5 which stores a variety of application programs including the above-mentioned control programs, scene data, arpeggiator stream data, and so forth; a display 6 comprised of a liquid crystal display (LCD), light emitting diodes (LEDs), and so forth for displaying various kinds of information; and an image signal processing section 7 which receives and processes image signals. The above component elements 1 to 7 are connected to each other via a bus 8.

Examples of the external storage medium 5 include a flexible disk drive (FDD), a hard disk drive (HDD), and a magneto-optical disk (MO) drive. As mentioned above, the external storage device 5 is capable of storing control programs to be executed by the CPU 2; in case that any control programs are not stored in the ROM 3, control programs are stored in advance in the external storage device 5 and loaded into the RAM 4, so that the CPU 2 can be made to operate in the same manner as in the case where the control programs are stored in the ROM 3. This facilitates addition of control programs, version upgrade, and so forth.

The image signal processing section 7 is comprised of four image input channels and is capable of processing input image signals for up to four channels independently of each other at the same time. Specifically, the image signal processing section 7 includes input terminals In1 to In4 via which respective independent four image signals are input, four CH image signal processing sections 71 which process the image signals for respective channels, a cross-fader 72 which carries out cross-fading for switching between an image signal from an output terminal A and an image signal from an output terminal B among processed image signals output from the respective CH image signal processing sections 71, and an output terminal Out which outputs the processed image signals.

Each of the CH image signal processing sections 71 is comprised of a selector 71a which selects one from image signals input to the respective input terminals IN1 to IN4, an image quality control section 71b which controls the image quality of the selected image signal, an image position control section 71c which controls the position of a displayed image; a fader 71d which controls the level of the image signal; a switch 71e which selectively turns on (outputs) or off (mutes) the image signal, and a selector 71f which selectively outputs the image signal to the cross-fader 72.

The cross-fader 72 is comprised of two faders 72a and 72b. By controlling the faders 72a and 72b, an image signal from the output terminal A can be switched to an image signal from the output terminal B by cross-fading, and conversely, an image signal from the output terminal B can be switched to an image signal from the output terminal A by cross-fading.

It should be noted that the selector 71f can also select an output terminal "through" via which the image signal is output to the output terminal Out without being output to the cross-fader 72.

The component elements 71a to 71f, 72a, and 72b are controlled by the CPU 2 via the bus 8.

Figure 2:
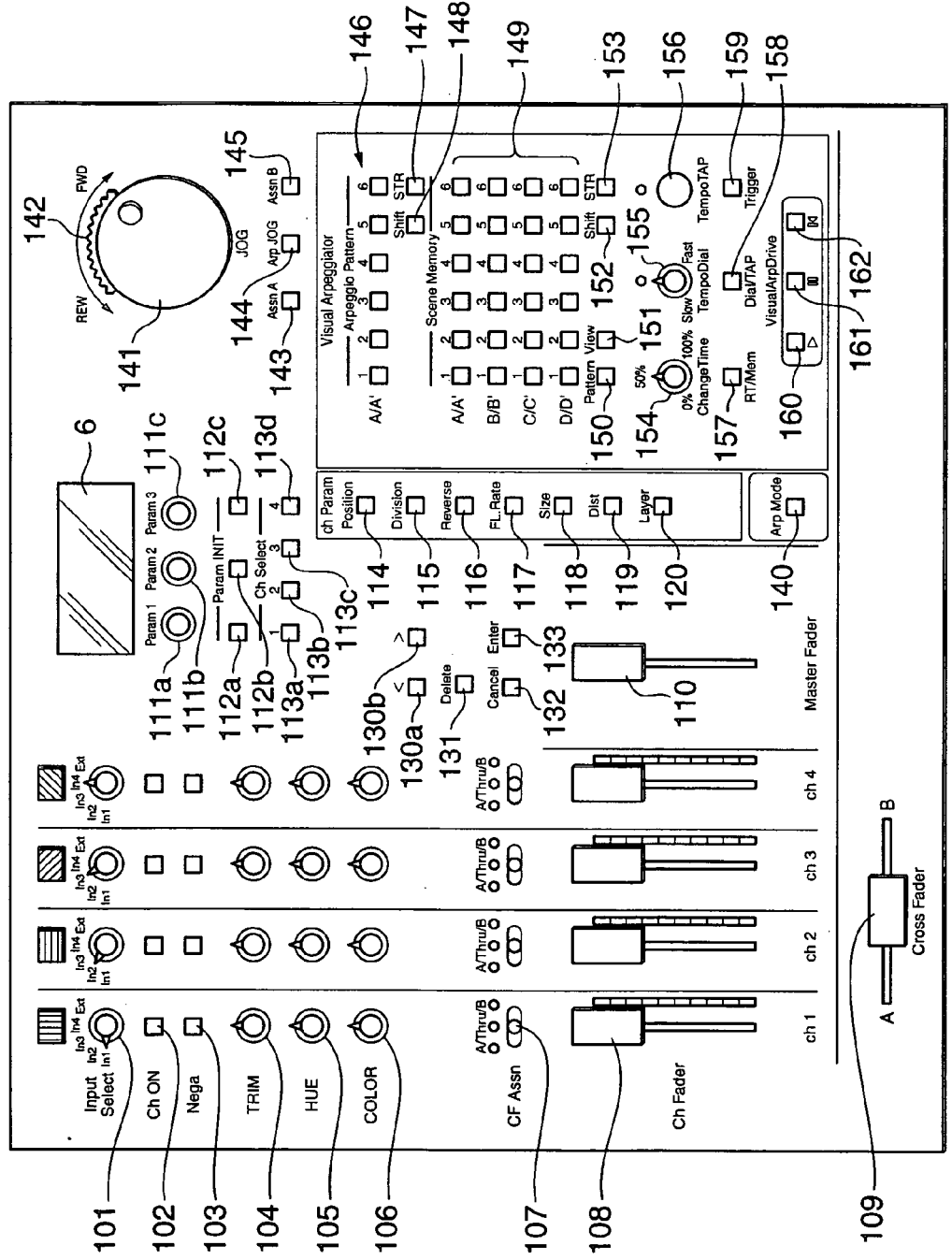
FIG. 2 is a view showing an example of the layout of a panel surface of the video mixer in FIG. 1.

FIG. 2 is a view showing an example of the layout of a panel surface of the video mixer according to the present embodiment.

In FIG. 2, an input select switch 101 is for specifying the selection status of the selector 71a, and is configured to select any of five statuses. For example, if the operator selects "In1" using the switch 101, the selector 71a selects an image signal input to the input terminal In1. It should be noted that the fifth status ("Ext") is not intended to be selected by the selector 71a, but is intended to give an instruction for outputting a still image stored in a predetermined memory, not shown, to an external device.

A channel-on (Ch On) button 102 is for specifying the ON/OFF state of the switch 71e.

A negative (Nega) button 103 is for specifying the negative/positive state of the image signal being displayed, and a trim (TRIM) volume control 104 is a gain control volume control common to a Y (luminance) signal and a C (color) signal, and a hue (HUE) volume control 105 is for controlling the hue, and a color (COLOR) volume control 106 is for controlling the color.

A cross-fader assign (CF Assn) switch 107 is for specifying whether the processed image signal of the corresponding channel is to be output to the cross-fader 72, and if yes, the switch 107 specifies which one of faders 72a and 72b the image signal is to be output to. A channel fader (CH Fader) 108 is for controlling the level of the image signal, and for setting the gain of the fader 71d. A cross fader (Cross Fader) 109 is for setting the output level of image signals output from the respective faders 72a and 72b. Further, a master fader (Master Fader) 110 is for controlling the output level of an image signal obtained by mixing.

Parameter (Param 1, Param 2, and Param 3) value setting knobs 111a to 111c are for setting values of parameters selected from a plurality of parameters common to the channels. Parameter value initializing (Param INIT) buttons 112a to 112c are for changing the parameter values set using the parameter value setting knobs 111a to 111c back to initial values. Channel selection (Ch Select) buttons 113a to 113d are for selecting a channel in which the selected parameters common to the channels are to be set.

A position (Position) parameter selecting button 114 is for selecting a parameter which determines a screen position for the selected channel, i.e. the channel selected using the channel selecting buttons 113a to 113d, a division (Division) parameter selecting button 114 is for selecting a parameter which determines the number of screen divisions for the selected channel, a reverse (Reverse) parameter selecting button 116 is for selecting a parameter which determines whether the screen for the selected channel is to be displayed in reverse or not, a frame rate (FL. Rate) parameter selecting button 117 is for selecting a parameter which determines the frame rate of the selected channel, a size (Size) parameter selecting button 118 is for selecting a parameter which determines the screen size of the selected channel, a distortion (Dist) parameter selecting button 119 is for selecting a parameter which determines the extent to which the screen for the selected channel is to be distorted, and a layer (Layer) parameter selecting button 120 is for selecting a parameter which determines whether the selected channel is to be displayed in layers or not.

A left arrow (<) button 130a is for changing the present setting to the left (e.g. in such a direction as to decrease), and a right arrow button (>) 130b is for changing the present setting to the right (in such a direction as to increase). A delete (Delete) button 131 is for deleting the present setting, a cancel (Cancel) button 132 is for canceling the present setting, and an enter (Enter) button 133 is for fixing the present setting.

A visual arpeggio mode (Arp Mode) selecting button 140 is for shifting to a visual arpeggio (Visual Arpeggio) mode. Operating elements 141 to 162 are mainly used in the visual arpeggio mode, and hence a description will now be given of how to use the operating elements 141 to 162 by taking (a) a scene memory setting function, (b) an arpeggiator stream creating function, (c) an arpeggiator reproducing function, (d) a real-time arpeggiator selecting function, and (e) an arpeggiator jog function in the visual arpeggio mode as examples. It should be noted that the following description is intended for explaining how to use the operating elements 141 to 162, but is not intended for explaining the above functions (a) to (e), and therefore, the terms "scene", "arpeggiator stream", "arpeggiator", "arpeggiator jog", and so forth will not be described.

(a) The Scene Memory Setting Function

First, when a store (STR) button 153 is depressed, the video mixer enters a storage location select mode, and the store button 153 blinks. Then, buttons corresponding to locations where scenes are stored (buttons corresponding to locations where scenes have already been input among 4×6 buttons 149) light, whereas buttons corresponding to locations where scenes have not yet been stored do not light. Further, when a shift (Shift) button 152 is depressed, the shift button 152 lights, and the location display is switched from "ABCD" to "A', B', C', D'". Then, if a button corresponding to a location desired for storage is depressed, the button starts blinking. If different buttons are depressed in sequence, they sequentially start blinking. The blinking of a button notifies the operator that a location corresponding to the button is selected as a storage location. When the store button 153 is depressed again in the state in which a storage location has been selected, the currently set parameter values are stored in the location corresponding to a blinking button, the store button 153 is turned off, and then the button corresponding to the storage location lights. On the other hand, when the delete button 131 is depressed in the state in which a storage location has been selected, the contents of the location are cleared. Further, when the cancel button 132 is depressed before storage, a storage operation is canceled, and the storage location select mode is canceled. On this occasion, a preset scene can be called by depressing a pattern (Pattern) button 150. If there are a plurality of preset scenes, a different preset scene is called each time the pattern button 150 is depressed. This operation may also be carried out by operating a JOG dial 141.

(b) Arpeggiator Stream Creating Function

First, when a store (STR) button 147 is depressed, the video mixer enters a stream create mode, and the store button 147 blinks. Then, buttons corresponding to locations where streams have already been input (buttons corresponding to locations where streams have already been input among six buttons 146) light, whereas buttons corresponding to locations where streams have not yet been input do not light. Further, when a shift (Shift) button 148 is depressed, the shift button 148 lights, and the location display is switched from "A" to "A'". Then, when a button 146 corresponding to a location where a stream is desired to be input is depressed, the button starts blinking. If different buttons 146 are depressed in sequence, they sequentially start blinking. The blinking of a button 146 notifies the operator that a location corresponding to the button is selected as an input location. If a location where a stream has already been input is selected, a stream desired to be input is attached to the end of an already selected stream. Therefore, in the case where a stream is desired to be newly input to a certain location, the contents of the location must be cleared as described later. In the state in which an input location has been selected, the buttons 149 corresponding to scenes which are desired to be arpeggiated are sequentially depressed. Change times, which are indicated upon depression of the buttons 149, are also stored at the same time, and hence, before each scene button 149 is depressed, it is necessary to set the change time to a desired time using a change time (Change Time) dial 154. If an incorrect scene button 149 is depressed, the preceding state is restored by depressing the left arrow button 120a. If the state is returned to a state preceding the preceding state by overshooting, however, the state is advanced by depressing the right arrow button 120b. In the present embodiment, it is configured such that up to 128 scenes can be designated as a stream. When the store button 147 is depressed again in the state in which scenes have been designated as a stream, the scenes are input to a blinking input location, and the store button 147 is turned off, and a button corresponding to the input location lights. On the other hand, when the delete button 131 is depressed in the state in which an input location has been selected, the contents of the location are cleared. Further, when the cancel button 132 is depressed before scenes are input; the stream creating operation is canceled, and the stream create mode is canceled. When a view (View) button 151 is depressed, the video mixer enters a mode in which the outline of a scene is shown on the display 6 before the scene is determined to be used. In this case, a scene is not selected until the same button corresponding to the scene is depressed twice.

(c) Arpeggiator Reproducing Function

As described above, the buttons 146 corresponding to locations where arpeggiator streams have already been input light, and hence, if any of the buttons 146 is selected, the selected button 146 starts blinking. Then, depressing a reproducing button 160 starts reproduction of the selected arpeggiator stream. When the reproducing button 160 is depressed again in this state, the reproduction is paused, and further, when the reproducing button 160 is depressed again in this state, the reproduction is resumed. It should be noted that the reproduction proceeds in synchronism with the tempo which is set using a tempo dial (Tempo Dial) 155. Further, when a stop button 161 is depressed, the reproduction is stopped, and when a return-to-head button 162 is depressed, the reproduction is started again with the scene at the head of the arpeggiator stream. As described above, the change time is changed according to scenes that are reproduced, but if an RT/Mem button 157 is turned on, the change time dial 154 is enabled so that one scene can be changed to another according to a change time set using the change time dial 154. Further, when a Dial/TAP button 158 is turned off, the tempo dial 155 is enabled, and when the Dial/TAP button 158 is turned on, a tempo tap (Tempo TAP) 156 is enabled. The tempo tap 156, when it is tapped, sets the tempo; the tempo is set according to the average of tempos which have been set by last four times of tapping (the number of times can be set according to a menu). It should be noted that a trigger (Trigger) button 159 is intended for adjusting arpeggiator reproducing timing.

(d) Real-time Arpeggiator Selecting Function

Since the buttons 149 corresponding to locations where scenes have been set are lighted up as described above, any of the lighting buttons 149 is selected one by one. On this occasion, scenes between the selected scenes are interpolated in synchronism with the tempo and the change time. The scene which is selected first, however, appears suddenly without being interpolated. When the view button 151 is depressed, the video mixer enters a mode in which the outline of a scene is shown on the display 6 before the scene is determined to be used. In this case, a scene is not selected until the same button corresponding to the scene is depressed twice.

(e) Arpeggiator Jog Function

When the video mixer is caused to enter an assign mode by depressing an assign A (Assn A) button 143 or an assign (Assn B) button 144, the assign A button 143 or the assign B button 144 blinks. When a scene is selected by depressing any of the lighting buttons 149, the depressed button 149 starts blinking. If different buttons are depressed in sequence, they sequentially start blinking. When the flashing assign A button 143 or assign B button 144 is depressed again with the button 149 being depressed, a scene corresponding to the flashing button 149 is assigned to the depressed assigned button, which then starts lighting. When the delete button 131 is depressed in a state in which an assignment can be made, the corresponding assign memory is cleared, and when the cancel button 132 is depressed before an assignment is made, the assigning operation is canceled, and the assign mode is canceled. Then, when an arpeggiator jog (Arp JOG) button 144 is turned on, the status of the assign A button is displayed. If no scene is assigned as the assign A button, the display is blacked out. If scenes are assigned to both the assign A button and the assign B button, by turning the JOG dial 141 clockwise, switching is made from the scene assigned to the assign A button to the scene assigned to the assign B button while carrying out interpolation. On the other hand, when the JOG dial 141 is turned counterclockwise, the scene is returned to the scene assigned to the assign A button. During interpolation, another scene may be assigned to the assign A button or the assign B button, and in this case, the scene is suddenly changed to the present position at which the scene is being subjected to interpolation.

Referring next to FIGS. 3 to 9, a detailed description will be given of a control process carried out by the video mixer constructed as described above.

Figure 3:
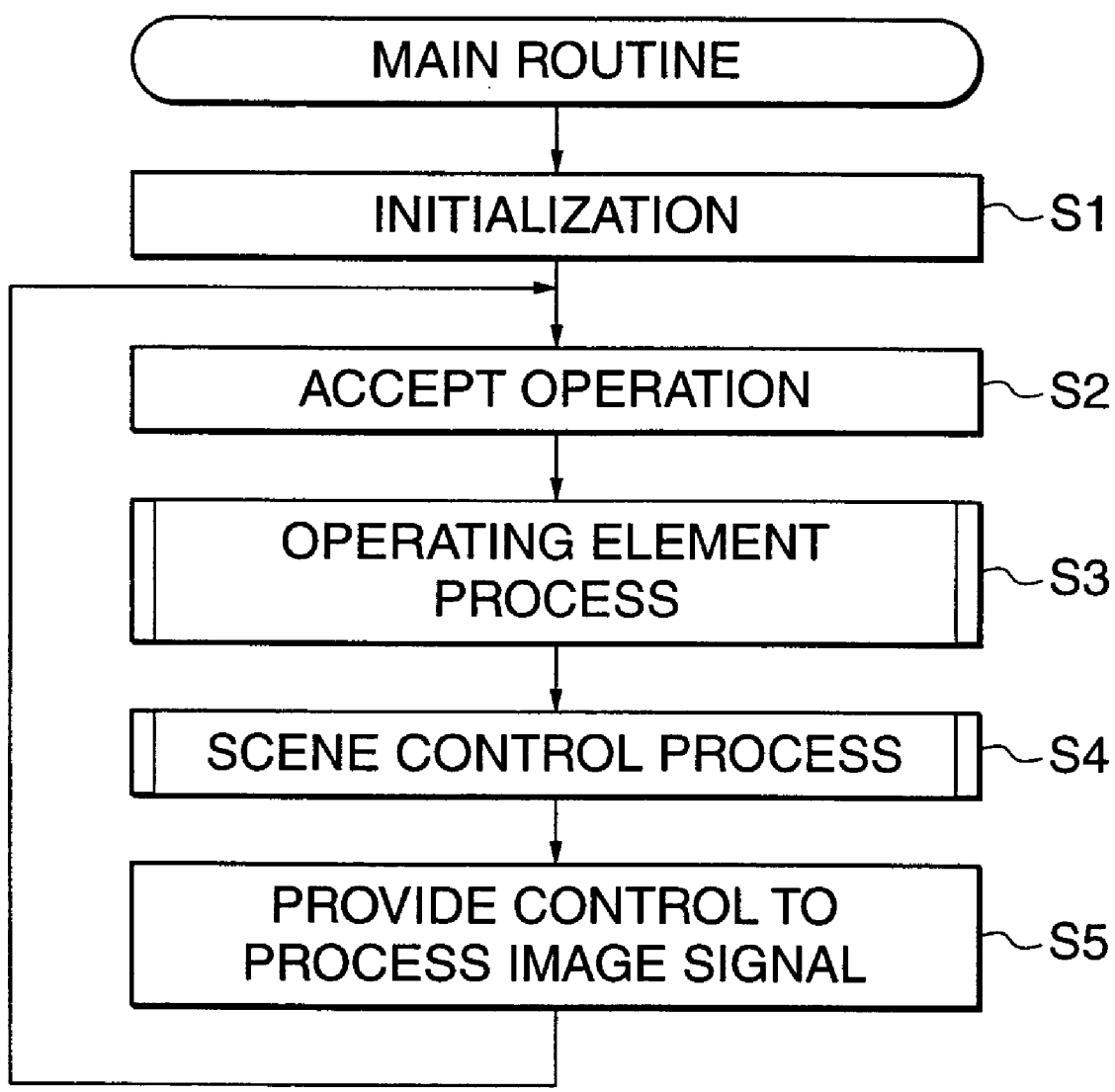
FIG. 3 is a flow chart showing a main routine executed by the video mixer in FIG. 1, and more particularly by a CPU.

FIG. 3 is a flow chart showing a main routine carried out by the video mixer according to the present embodiment, and more particularly by the CPU 2. This main routine is started e.g. when power supply for the mixer is turned on.

When the main routine is started, initialization such as clearing of the RAM 4 and setting of various parameter values to defaults is carried out (step S1), and then, an operation performed using any operating element of the operating element group 1 by the operator is accepted (step S2). Then, an operating element process subroutine (described later in further detail with reference to FIGS. 4A and 4B) in which processing is carried out according to the accepted operation is executed (step S3), and a scene control process subroutine (described later in further detail with reference to FIGS. 5A and 5B) in which a scene control process is carried out according to selected arpeggiator data is executed (step S4). Then, control is provided to process an image signal according to settings made by the scene control process (step S5), and the process returns to the step S2 to execute the steps S2 to S5 again.

Figure 4A:
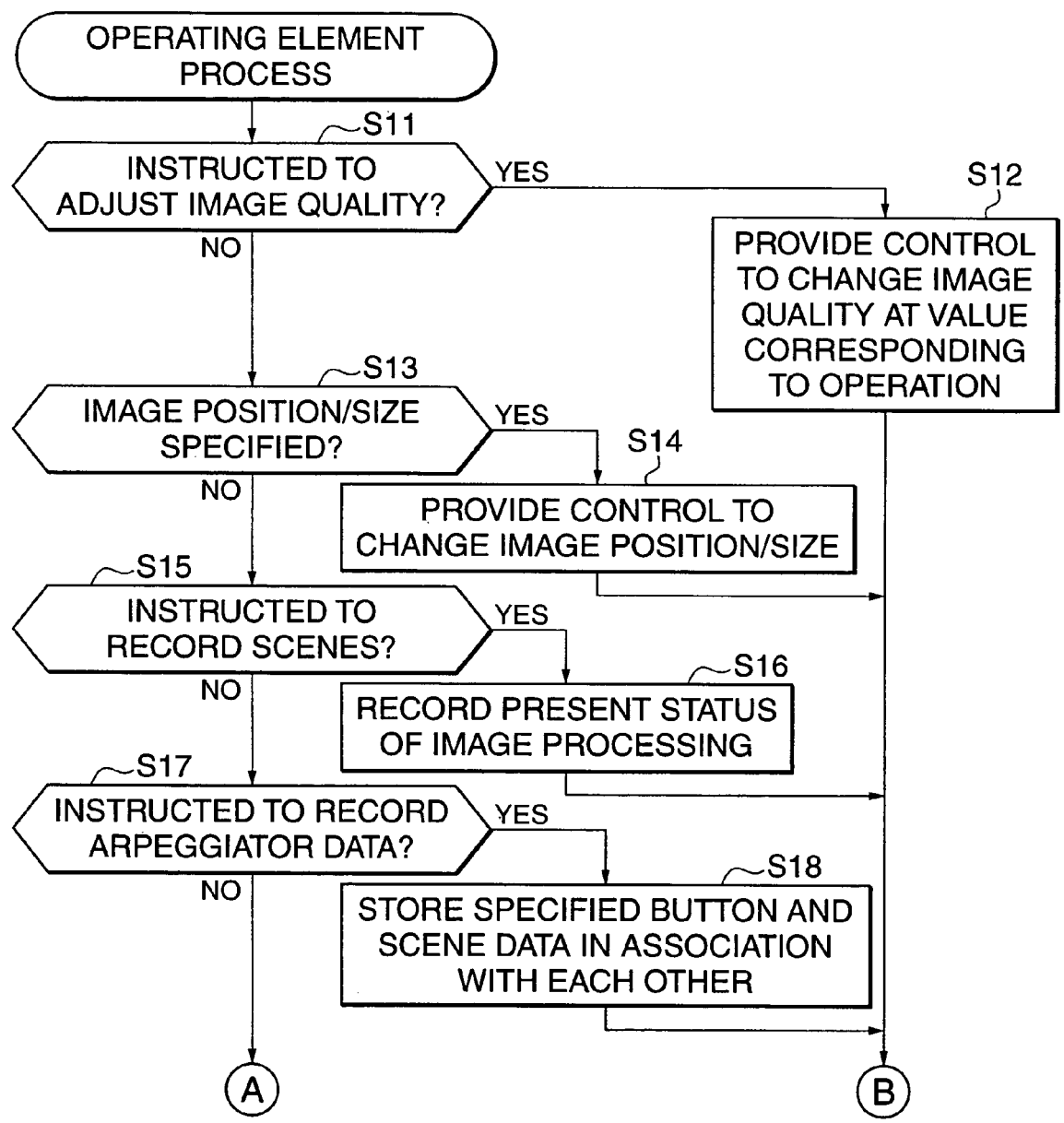
FIGS. 4A and 4B are flow chart showing in detail an operating element process subroutine in a step S3 in FIG. 3.
Figure 4B:
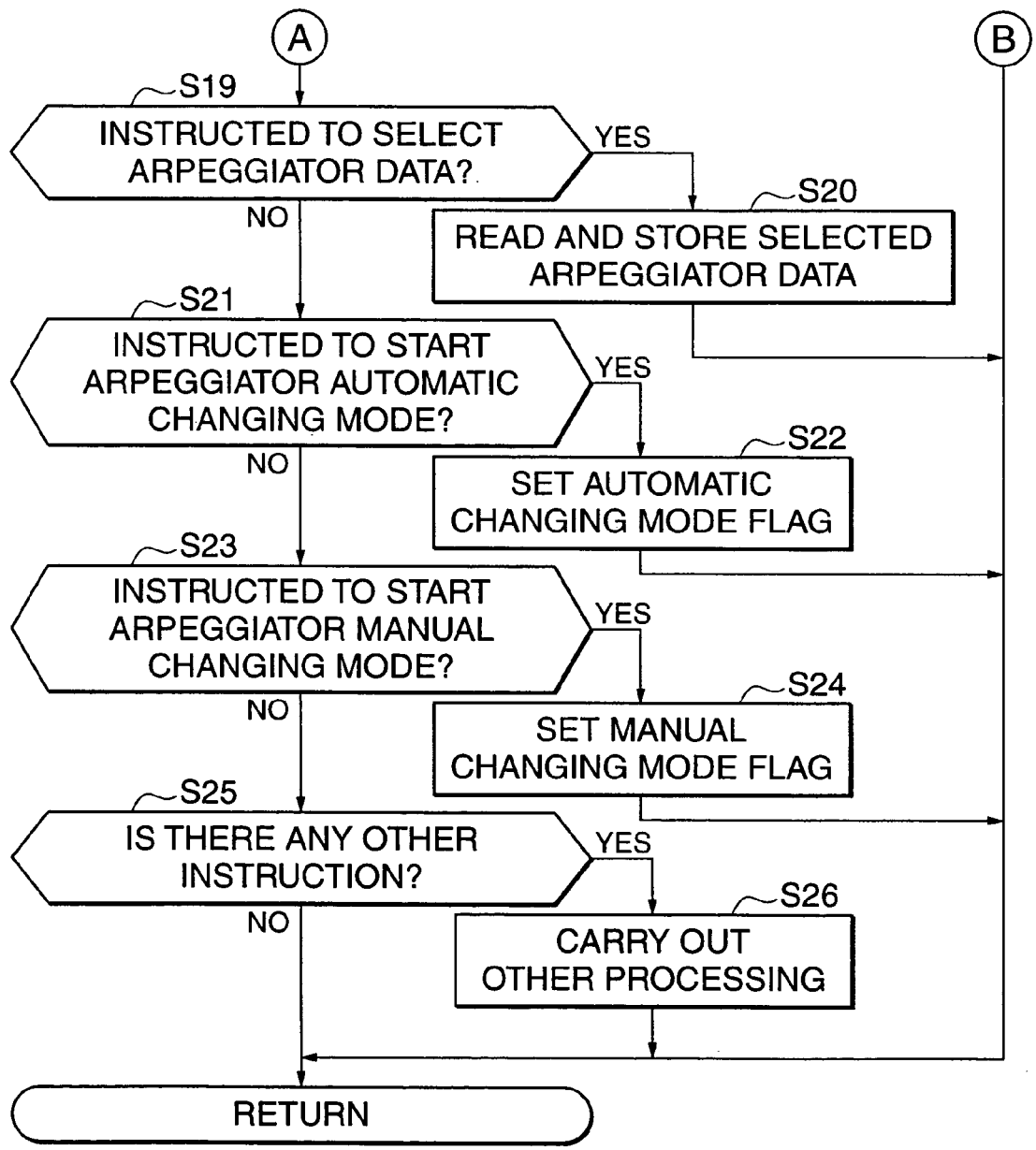

FIGS. 4A and 4B are flow chart showing in detail the operating element process subroutine executed in the step S3.

In the operating element process subroutine in the step S3, the following processes are mainly carried out:

(1) a setting process in which image processing information is set to the image signal processing section 7;

(2) a scene recording process;

(3) an arpeggiator recording process;

(4) an arpeggiator data selecting process;

(5) an arpeggiator automatic changing mode process;

(6) an arpeggiator manual changing mode process; and (7) other processes.

Examples of the setting process (1) include setting for adjusting the image quality of an image signal using e.g. any of the operating elements 102 to 106, and setting for determining the position/size of an image using e.g. any of the operating elements 111a to 111c, 114, 118, and 120.

Specifically, when an instruction for adjusting the image quality is given using e.g. any of the operating elements 102 to 106, the image quality is controlled to be changed according to a value corresponding to the instruction (steps S11 and S12). For example, when an instruction for adjusting the hue of an image signal of the channel 1 is given using the hue volume control 105, the CPU 2 provides control to set such a value as to realize the specified hue for the image quality control section 71b.

Also, when the position/size of an image is specified using e.g. any of the operating elements 111a to 111c, 114, 118, and 120, the image is controlled to be changed to realize the specified position/size (steps S13 and S14). Specifically, when an instruction for changing the screen position is given using the parameter value setting knobs 111a to 111c in the case where an image signal of the channel 1 is displayed in layers, and a screen position parameter is selected, the CPU 2 provides control to set such a value as to realize the specified screen position for the image position control section 71c.

In the scene recording processing (2), scenes i.e. image processing information set in the setting process (1) is recorded (stored) in a scene memory region reserved in the external storage device 5. The reason why scenes are recorded is that in the present embodiment, real-time processing is carried out on image signals transmitted in real time, and hence, if image processing information (scene) required for the processing is created each time it is needed, it is impossible to carry out real-time processing.

In response to an instruction for recording scenes, the setting status of image processing information at present is recorded (steps S15 and S16). The procedure for recording scenes has already been described, and description thereof is therefore omitted.

Figure 7A:
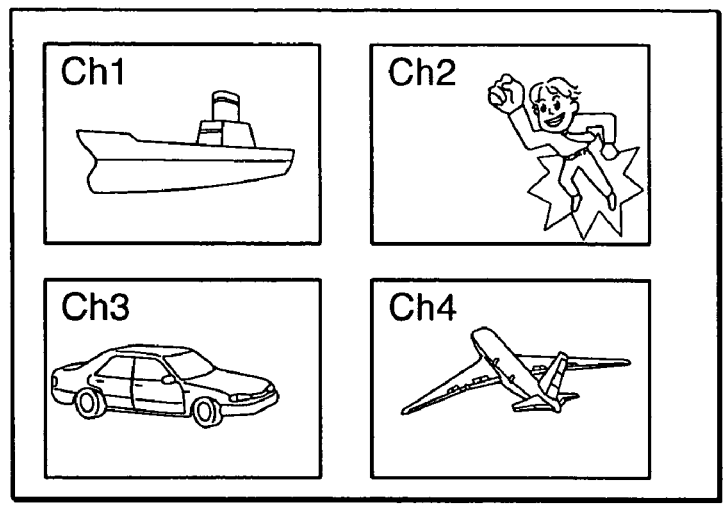
Figure 7B:
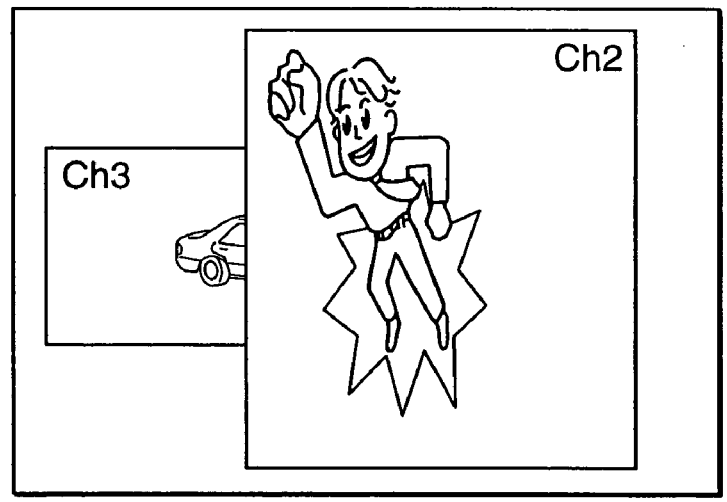
Figure 7C:
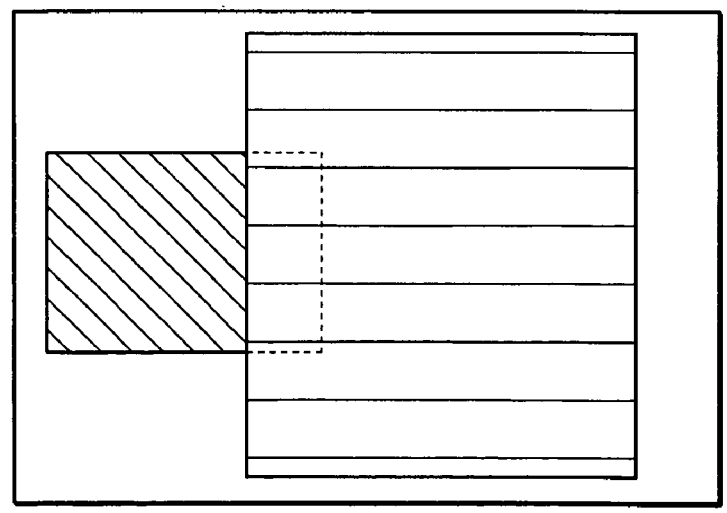

Referring to FIG. 7A to 7C, a description will now be given of how to use recorded scenes.

FIG. 7A is a view showing an example where image signals input to the respective channels 1 to 4 are processed and displayed based on a recorded scene 1, i.e. according to an image processing manner in which four-split screens are displayed in layers. In this state, when a stored scene 2, i.e. an image processing manner in which two screens for the respective channels 2 and 3 are displayed in layers, the screen for the channel 2 is enlarged, and the position of the screen for the channel 3 is shifted upward is called, image signals input to the respective channels 2 and 3 are processed and displayed based on the scene 2 as shown in FIG. 7B. Although in the present embodiment, if a plurality of screens are overlapped, a screen for a channel with a smaller channel number is displayed with a higher priority, the present invention is not limited to this, but the user may arbitrarily determine which screen is to be displayed with a higher priority.

Further, when an instruction for calling the scene 2 is given with the view button 151 being depressed, the outline of the scene 2 is displayed on the display 6 as shown in FIG. 7C, and then, when an instruction for calling the scene 2 is given again, processing is performed on the real image signals as shown in FIG. 7B.

In the arpeggiator recording process (3), arpeggiator streams mentioned above are created and recorded (stored). When an instruction for recording an arpeggiator stream is given, a combination of a button corresponding to a location where the arpeggiator stream is to be recorded, i.e. any of the six buttons 146 and scene data are specified, and both of them are stored in association with each other (steps S17 and S18). Here, the arpeggiator stream means data which is formed by arranging a plurality of scenes to be reproduced in order of reproduction so that the scenes can be reproduced. It should be noted that the procedure for recording (creating) arpeggiator streams has already been described, and description thereof is therefore omitted.

In the arpeggiator data selecting process (4), any arpeggiator stream is selected from among a plurality of arpeggiator streams recorded by the arpeggiator stream recording process (3). In response to an instruction for selecting arpeggiator data, the selected arpeggiator stream is read out and stored in a predetermined region of the RAM 4 (steps S19 and S20).

In the arpeggiator automatic changing mode process (5), a plurality of scenes set in the arpeggiator stream selected by the arpeggiator stream selecting process (4) are automatically changed in sequence according to the tempo which is set as above. The automatic changing process is realized by the processes shown in FIGS. 5A, 5B and 6; in the process shown in FIG. 4B, an automatic changing mode flag is only set in response to an instruction for starting the arpeggiator automatic changing mode (steps S21 and S22).

In the arpeggiator manual changing mode process (6), a plurality of scenes set in the arpeggiator stream selected by the arpeggiator stream selecting process (4) are manually changed in sequence according to the tempo which is set as above using the JOG dial 141. The manual changing process is realized by the processes shown in FIGS. 5A, 5B and 6; in the process shown in FIG. 4B, a manual changing mode flag is only set in response to an instruction for starting the arpeggiator manual changing mode (steps S23 and S24).

Figure 8:
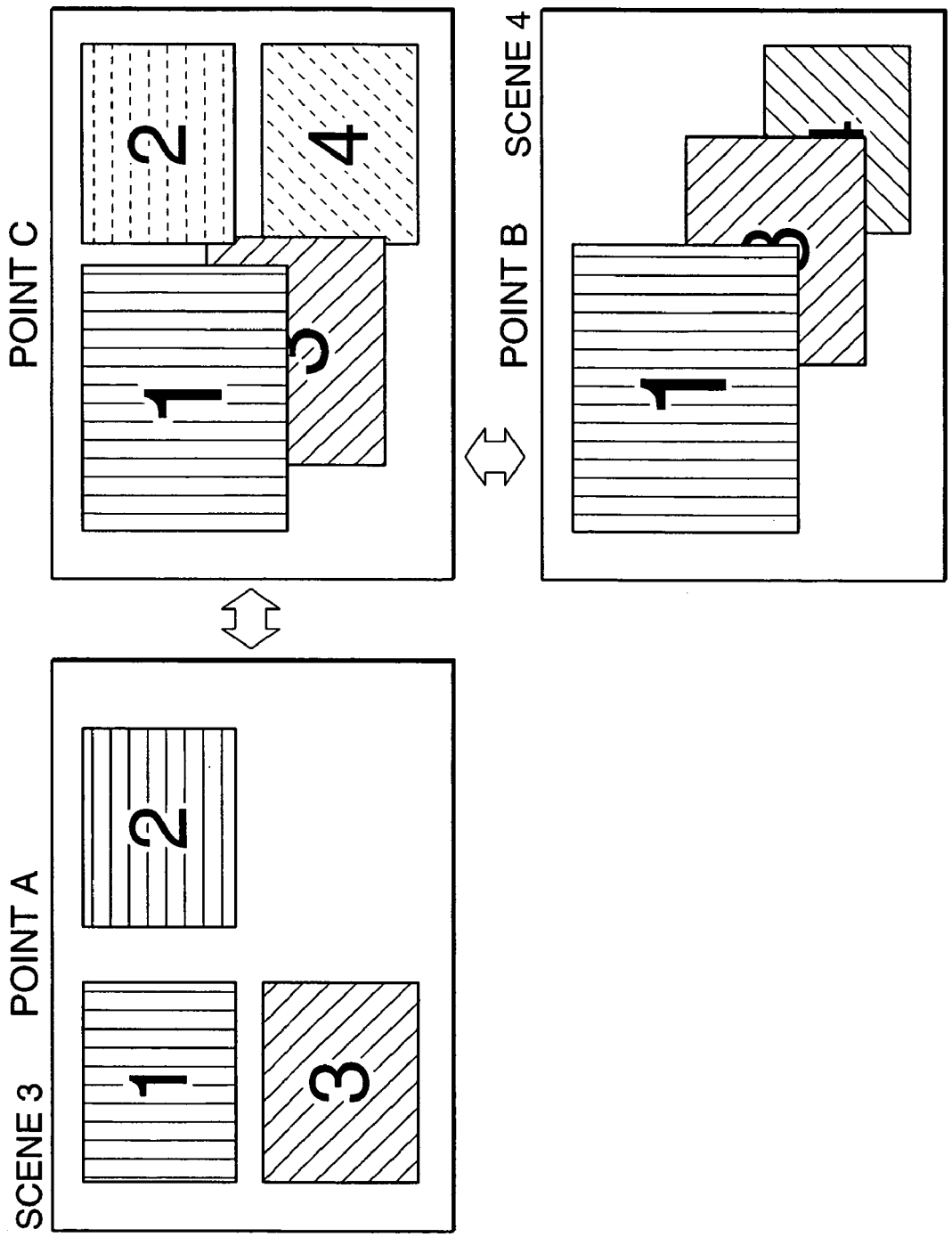
FIG. 8 is a view showing an example of screens displayed in the case where scenes 3 and 4 are set in this order in an arpeggiator stream, and an instruction for changing the intermediate state between the scene 3 and scene 4 is given.

FIG. 8 is a view showing an example of screens displayed in the case where a scene 3 and a scene 4 are set in this order in an arpeggiator stream, and an instruction for changing an intermediate state between the scene 3 and the scene 4 is given.

In FIG. 8, a point A indicates a time point image signals which have been processed based on the scene 3 are displayed, a point B indicates a time point image signals which have been processed based on the scene 4 are displayed, and a point C indicates a time point image signals which have been processed based on image processing information of an intermediate state between the scene 3 and the scene 4 are displayed. Specifically, the point A indicates the time point image signals of the channels 1 to 3 among the four channels are displayed with four-split screens being displayed in layers; the point B indicates the time point image signals of the channels 1, 3, and 4 are displayed with a screen for the channel 1 being enlarged, a screen for the channel 3 being enlarged and shifted, and a screen for the channel 4 being added; and the point C indicates the intermediate state between the scenes 3 and 4, i.e. the state in which the screen for the channel 1 is being enlarged, the screen for the channel 2 vaguely remains, the screen for the channel 3 is being enlarged and shifted, and the screen for the channel 4 is slightly standing out.

The state at the point C is realized by interpolating the scenes 3 and 4 according to information on the scene 3 at the point A, information on the scene 4 at the point B, and information indicative of how far the point C is from the point A (or the point B), and then processing the image signals of the four channels according to image processing information generated by the interpolation. It should be noted that the gist of the present invention does not lie in the manner of interpolation, and hence any interpolation method may be adopted. Examples of interpolation methods include a linear interpolation method and a curved interpolation method.

The other processes (7) literally mean processes other than the processes (1) to (6). When an instruction for carrying out the other processes is given, the processes are carried out in accordance with the instruction (steps S25 and S26).

Figure 5A:
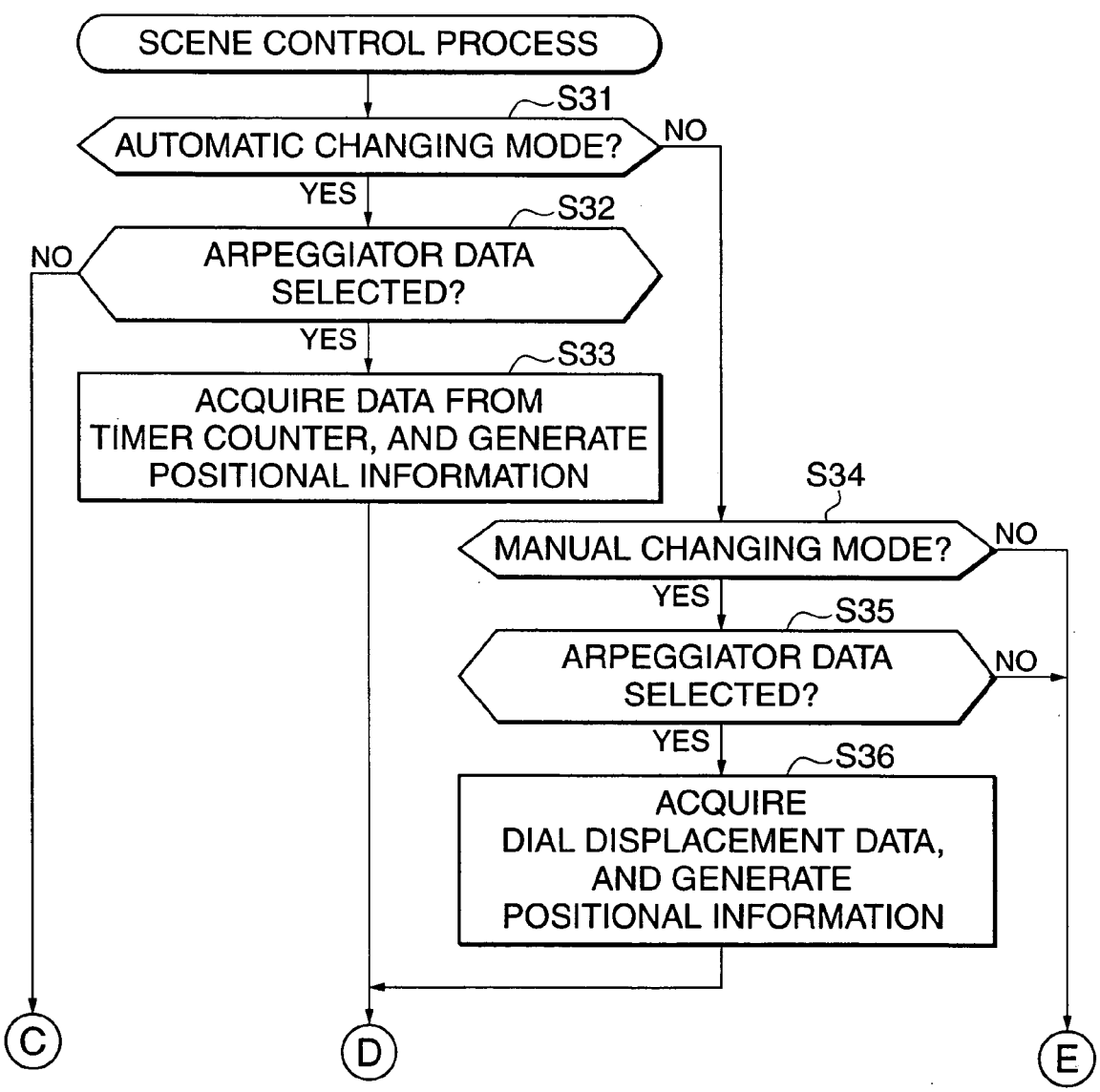
FIGS. 5A and 5B are flow chart showing in detail a scene control process subroutine in a step S4 in FIG. 3.
Figure 5B:
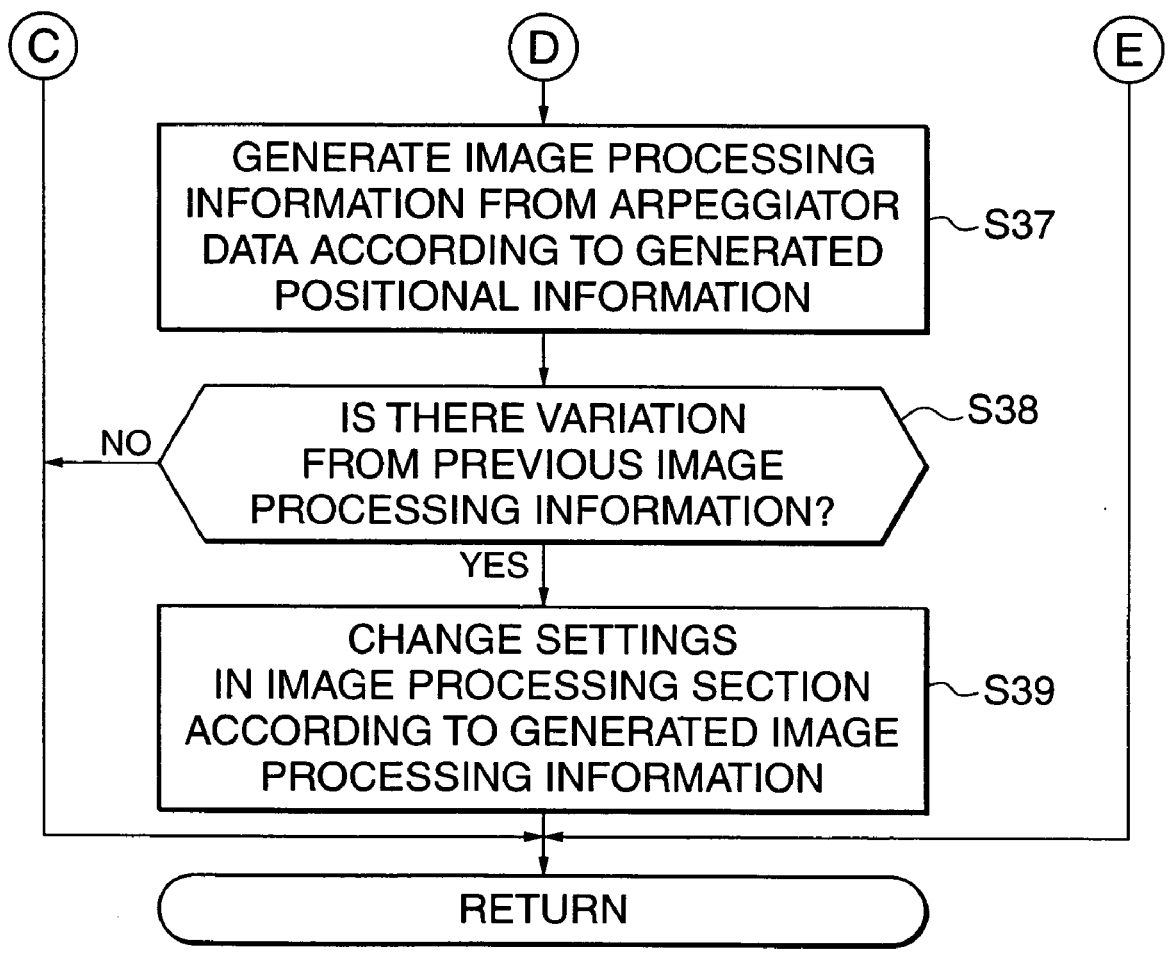
Figure 6:
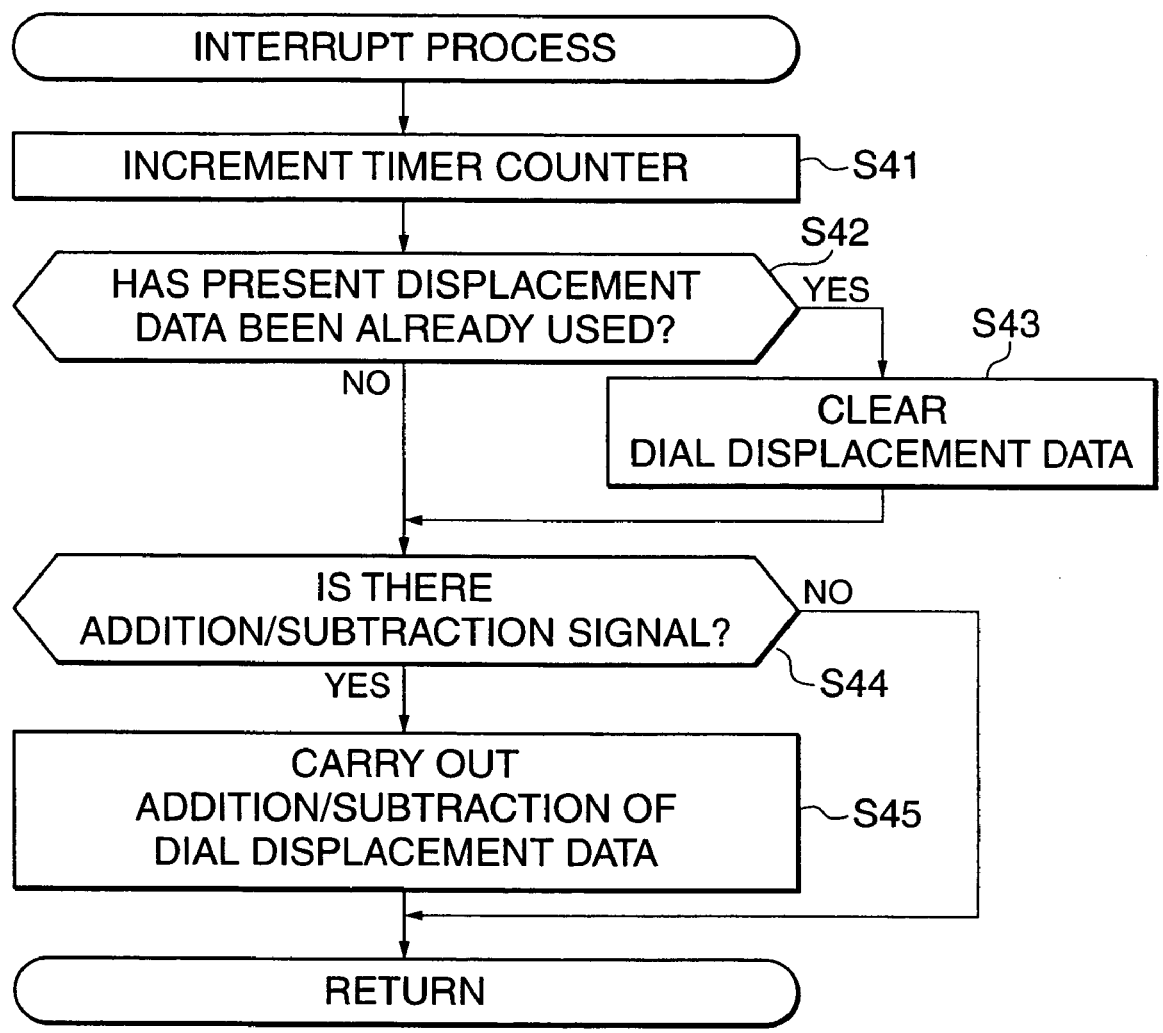
FIG. 6 is a flow chart showing an interrupt process.

FIGS. 5A and 5B are flow chart showing in detail the scene control process subroutine executed in the step S4. The scene control process subroutine specifies a substantive manner of providing control in the arpeggiator automatic changing mode process (5) and the arpeggiator manual changing mode process (6) as described above.

In FIG. 5A, when arpeggiator data (arpeggiator stream) has been selected in the arpeggiator automatic changing mode, data is acquired from a timer counter to generate positional information (steps S31, S32 and S33). The timer counter is for calculating the present changing position in the arpeggiator stream, and counting is carried out in a step S41 in an interrupt process in FIG. 6. The positional information is indicative of the present changing position in the arpeggiator stream, and can be easily calculated based on an interrupt time (a time at which the interrupt process is started), the count value of the timer counter, and the set tempo value.

Then, image processing information is generated from the arpeggiator data according to the generated positional information. If there is a variation between the generated image processing information and the previously set image processing information, the generated image processing information is set in the image signal processing section 7 (steps S37, S38 and S39).

On the other hand, when arpeggiator data (arpeggiator stream) has been selected in the arpeggiator manual changing mode, dial displacement data is acquired to generate positional information (steps S31, S34, S35 and S36). The dial displacement data is for calculating the present changing position in the arpeggiator stream, and is generated in a step S45 in the interrupt process in FIG. 6. Specifically, referring to FIG. 6, when an addition signal is output in response to operation of the JOG dial 141, the dial displacement data is incremented, and when a subtraction signal is output in response to operation of the JOG dial 141, the dial displacement data is decremented. It should be noted in the case where the dial displacement data has been used for displacement of scenes in the arpeggiator data, the dial displacement data is cleared (steps S42 and S43).

Then, image processing information is generated from the arpeggiator data according to the generated positional information. If there is a variation between the generated image processing information and the previously set image processing information, the generated image processing information is set in the image signal processing section 7 (steps S37, S38 and S39).

Figure 9:
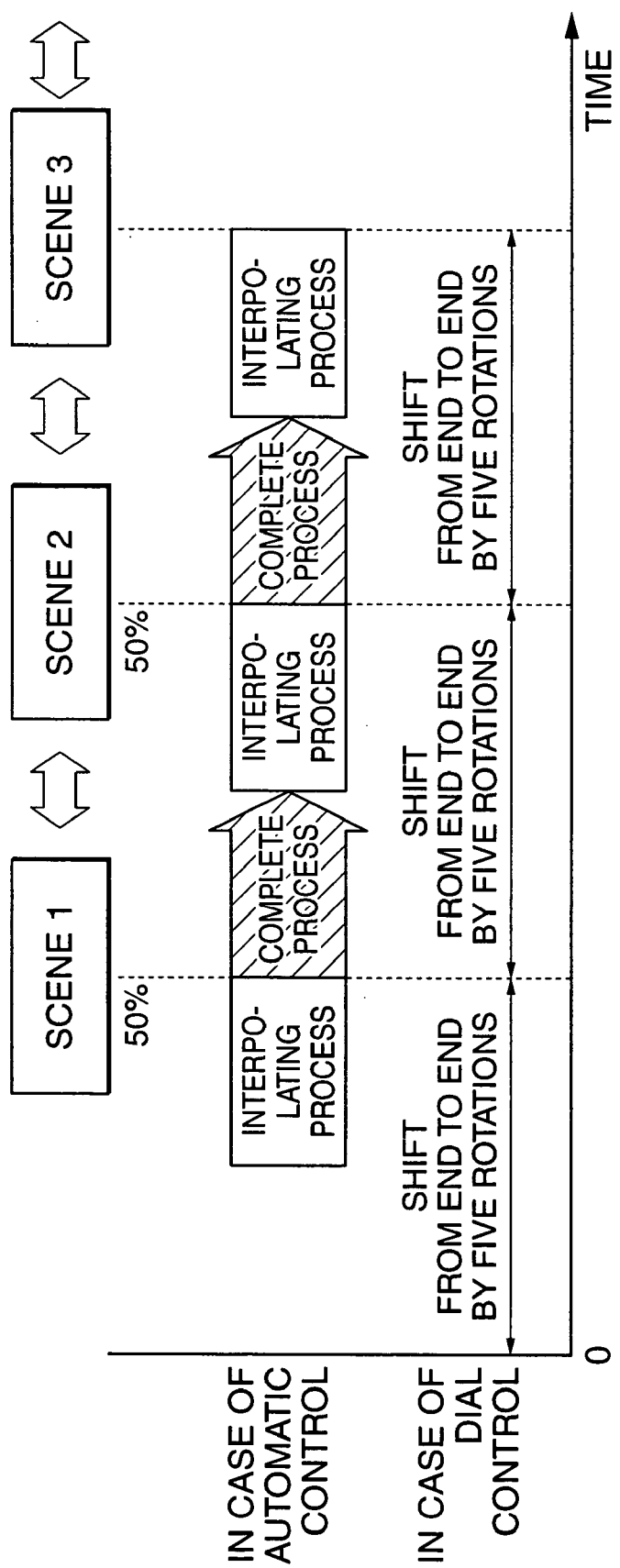
FIG. 9 is a view useful in explaining respective processes carried out in an arpeggiator data automatic changing mode and an arpeggiator data manual changing mode.

FIG. 9 is a view useful in explaining processes carried out in the arpeggiator data automatic changing mode and the arpeggiator data manual changing mode.

In FIG. 9, "50%" indicates the value of a change time specified using the change time dial 154. The change time means the percentage (%) of a period of time required for carrying out an interpolating process in a period of time from the readout of a certain scene to the completion of processing on image signals based on the scene (a complete process is carried out based on the scene in the remaining period of time). In the illustrated example, it is assumed that the change time is "50%", which means that the interpolating process and the complete process are carried out for the same period of time.

In the arpeggiator automatic changing mode, scenes are changed at a speed corresponding to the tempo set using the tempo dial 155 or the tempo tap 156. In the present embodiment, the changing position represented by "50%" corresponds to the position of beat.

In the arpeggiator manual changing mode, the JOG dial 141 is turned e.g. five times so as to change image processing information from the starting point of processing based on the previous scene up to the starting point of processing based on the next scene. In the arpeggiator manual changing mode as well, the change time setting is in effect, and the process is switched from the interpolating process to the complete process at the same position as in the arpeggiator automatic changing mode.

As described above, according to the present embodiment, the arpeggiator manual changing mode is provided, and scenes in an arpeggiator stream are changed according to operation of the JOG dial 141. Therefore, it is possible to give a changing instruction at an arbitrary speed, and thus improve the operability for the operator. Namely, the operator can give instructions for control with a higher degree of freedom.

Although in the present embodiment, a moving image signal is assumed as an image signal subjected to processing, the present invention is not limited to this, but a still image signal may be used, or a mixture of a moving image signal and a still image signal (for example, a moving image signal is subjected to processing in a certain channel, while a still image signal is subjected to processing in another channel) may be used.

Further, although in the present embodiment, the JOG dial 141 is used as an operating element for changing scenes in the arpeggiator manual changing mode, the present invention is not limited to this, but alternatively, a sliding operating element, an up/down key, or the like may be used. Further, it may be configured such that the JOG shuttle 142 as well as the JOG dial 141 is enabled in advance, and when the JOG shuttle 142 is operated, scenes are changed at a higher speed than in the case where the JOG dial 141 is operated.

It goes without saying that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a flexible disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from a server computer via a communication network.

Further, it goes without saying that the functions of the above described embodiment may be accomplished not only by executing the program code read out by a computer, but also by causing an OS (operating system) or the like which operates on the computer to perform a part or all of the actual operations based on instructions of the program code.

Further, it goes without saying that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image processing apparatus comprising:
    an
    input device that inputs image signals for a plurality of channels;
    a storage device that stores a plurality of kinds of processing procedures to be performed on the image signals;
    an operating element that specifies, as target processing procedures, at least two kinds of processing procedures among the plurality of kinds of processing procedures stored in said storage device, and enables at least one of the target processing specified procedures and also at least one processing procedure between the target processing procedures to be arbitrarily specified;
    a processing device, operable when the at least one processing procedure between the target processing procedures is specified said operating element, that generates the specified at least one processing procedure by interpolating the target processing procedures, and carries out real-time processing on at least one image signal for at least one corresponding channel among the image signals for the plurality of channels input by said input device according to the generated specified at least one processing procedure; and
    an output device that outputs an image signal, and wherein said processing device outputs the image signal, subjected to the real-time processing, in real time via said output device.

2. The image processing apparatus according to claim 1, wherein the procedures each comprise designating size and position of an image to be displayed in accordance with an image signal for a corresponding channel.

3. The image processing apparatus according to claim 1, wherein said operating element is capable of sequentially changing and specifying the stored processing procedures in said storage device and the processing procedure between the target processing procedures.

4. An image processing method that operates on and modifies image signals from an input device comprising the steps of:
   storing in a processor readable storage device a plurality of kinds of processing procedures to be performed on the image signals;
   when an operating element specifies, as target processing procedures, at least two kinds of processing procedures among the stored plurality of kinds of processing procedures stored in said storage device, and enables at least one processing procedure between the target processing procedures generating by a processing unit the specified at least one processing procedure between the target processing procedures by interpolating the target processing procedures, and carrying out real-time processing on at least one image signal for at least one corresponding channel among the image signals for the plurality of channels input by an said input device according to the generated specified at least one processing procedure; and
   outputting the image signal, subjected to the real-time processing, in real time via said output device.

5. A computer-readable storage medium encoded with computer-executable instructions to execute an image processing method that operates on a plurality of image signals from an input device, the method of instructions provide for:
   storing in a processor readable storage device a plurality of kinds of processing procedures to be performed on the image signals;
   when an operating element that specifies, as target processing procedures, at least two kinds of processing procedures among the stored plurality of kinds of processing procedures stored in said storage device, and enables at least one processing procedure between the specified target processing procedures, generating by a processing unit the specified at least one processing procedure between the target processing procedures by interpolating the target processing procedures, and carrying out real-time processing on at least one image signal for at least one corresponding channel among the image signals for the plurality of channels input by said input device according to the generated specified at least one processing procedure; and
   outputting the image signal, subjected to the real-time processing, in real time via said output device.

* * * * *